Figure 1:
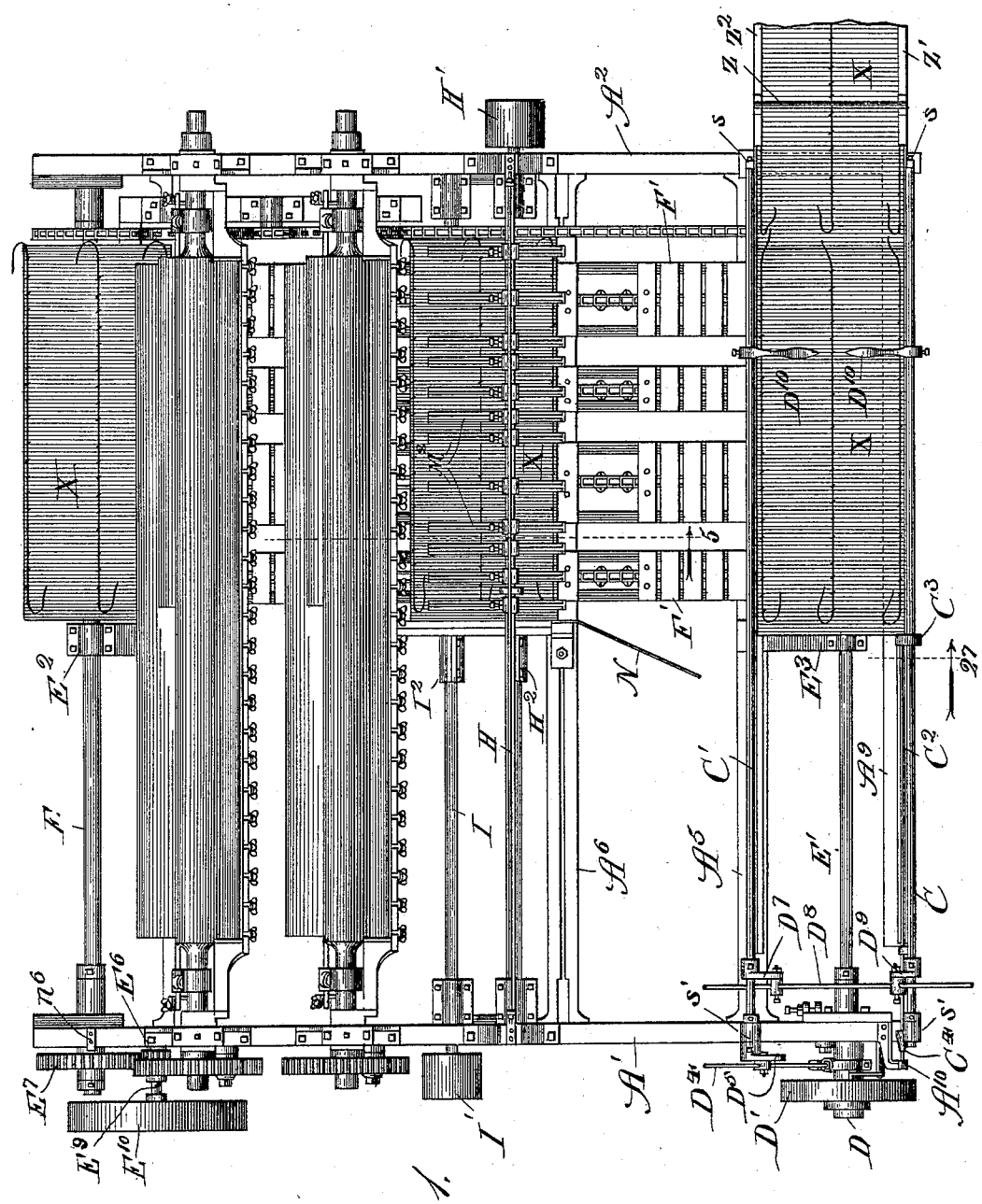

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 1.

Witnesses:
Chas. E. Gaylord,
Lutie S. Peters

Inventor:
Frederick P. Rosback,
By Dyrenforth & Dyrenforth,
Attys.

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 2.

Witnesses:
Chas. E. Gaylord,
Luther D. Peter

Inventor:
Frederick P. Rosback,
By Dyrenforth & Dyrenforth,
Attys.

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 3.
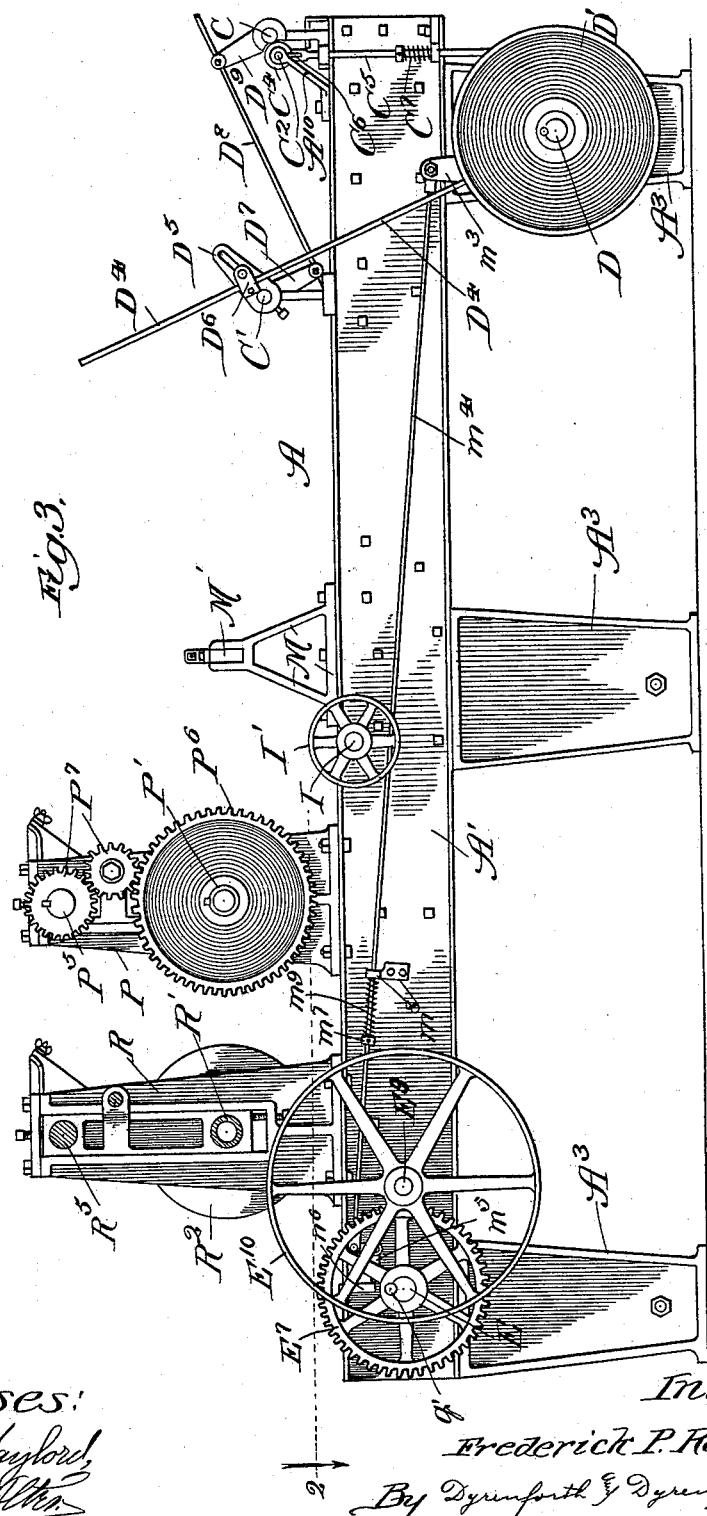
Witnesses:
Inventor:
Frederick P. Rosback,
By Dyrenforth & Dyrenforth,
Att'ys

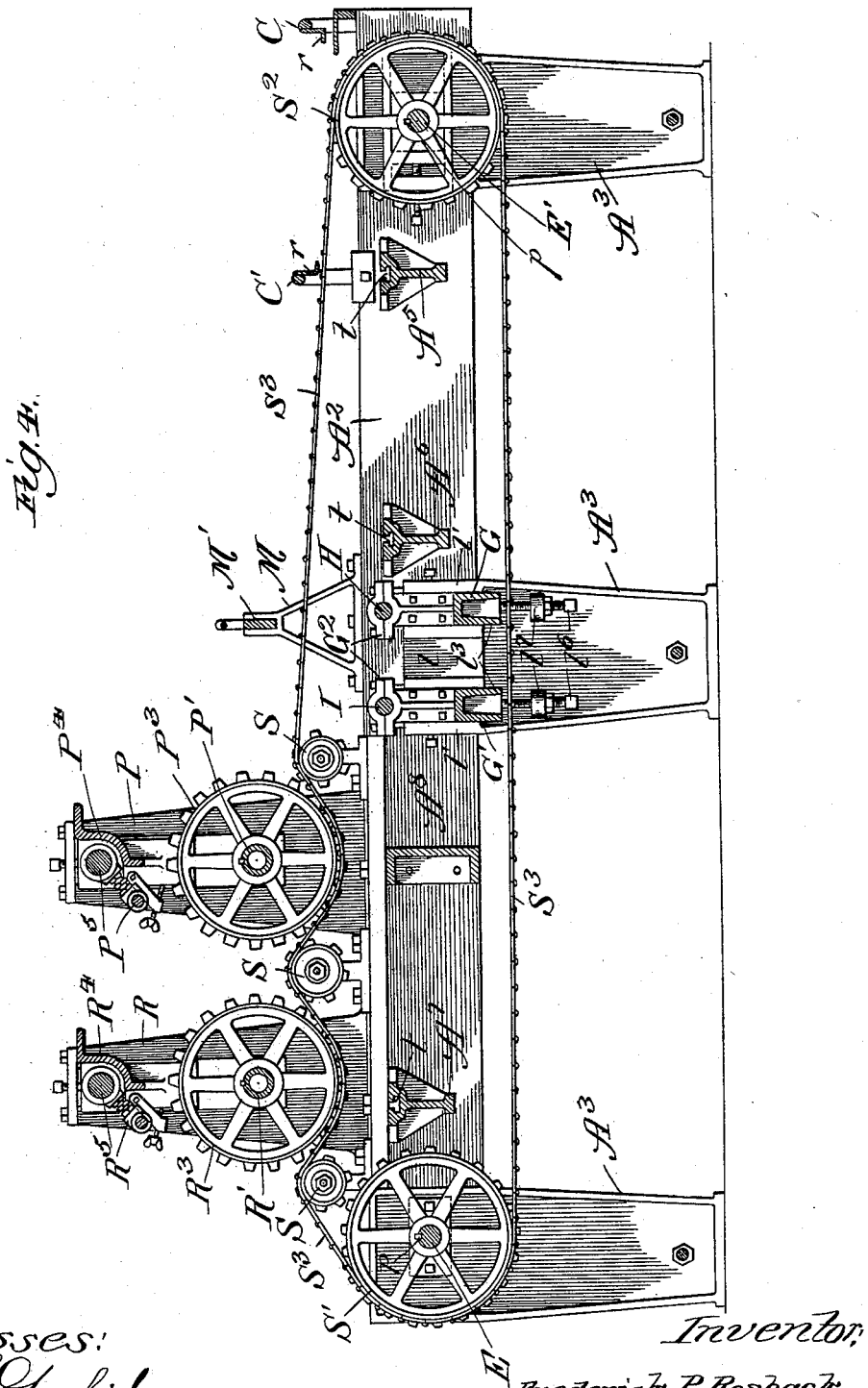

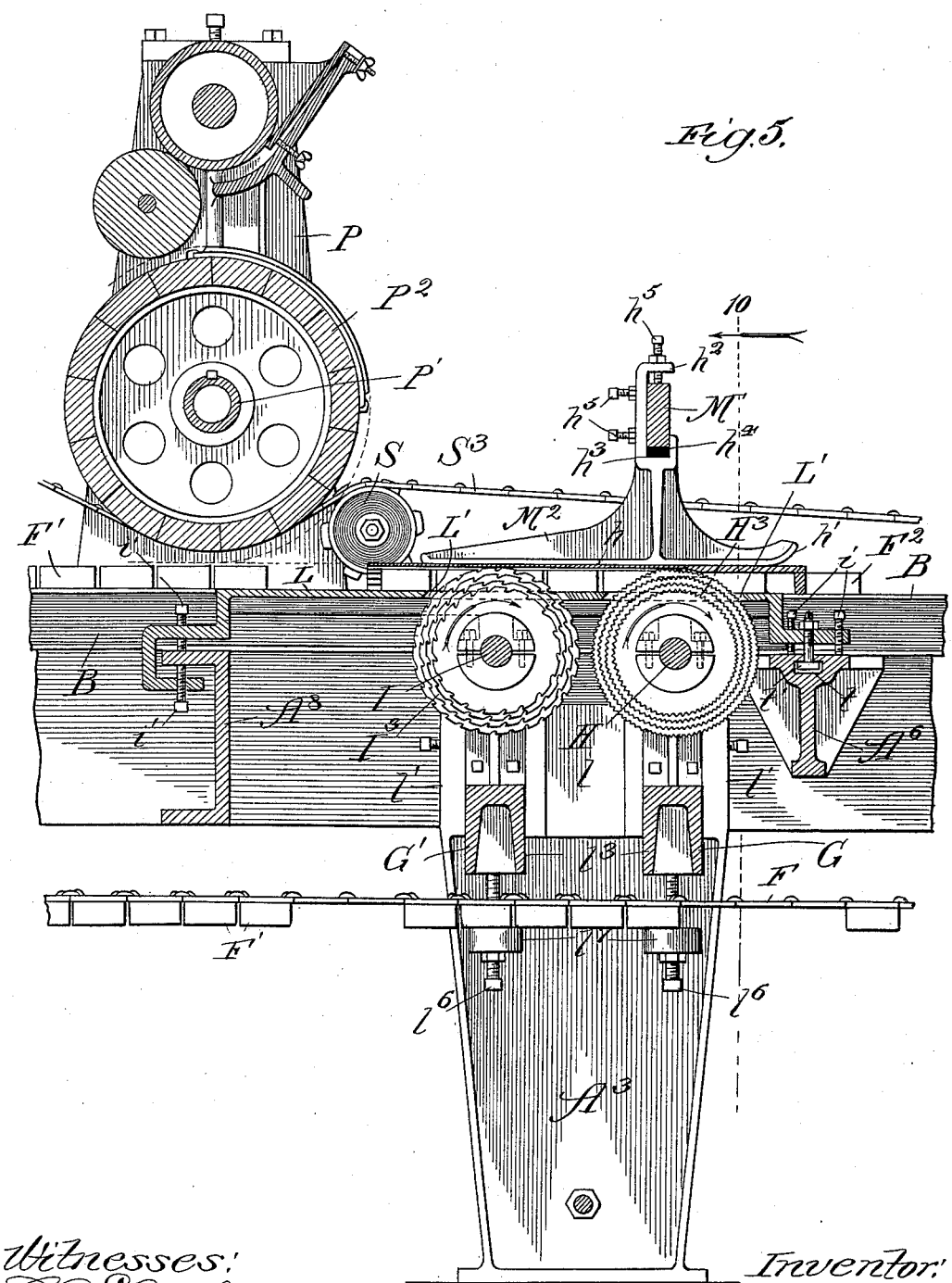

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 6.
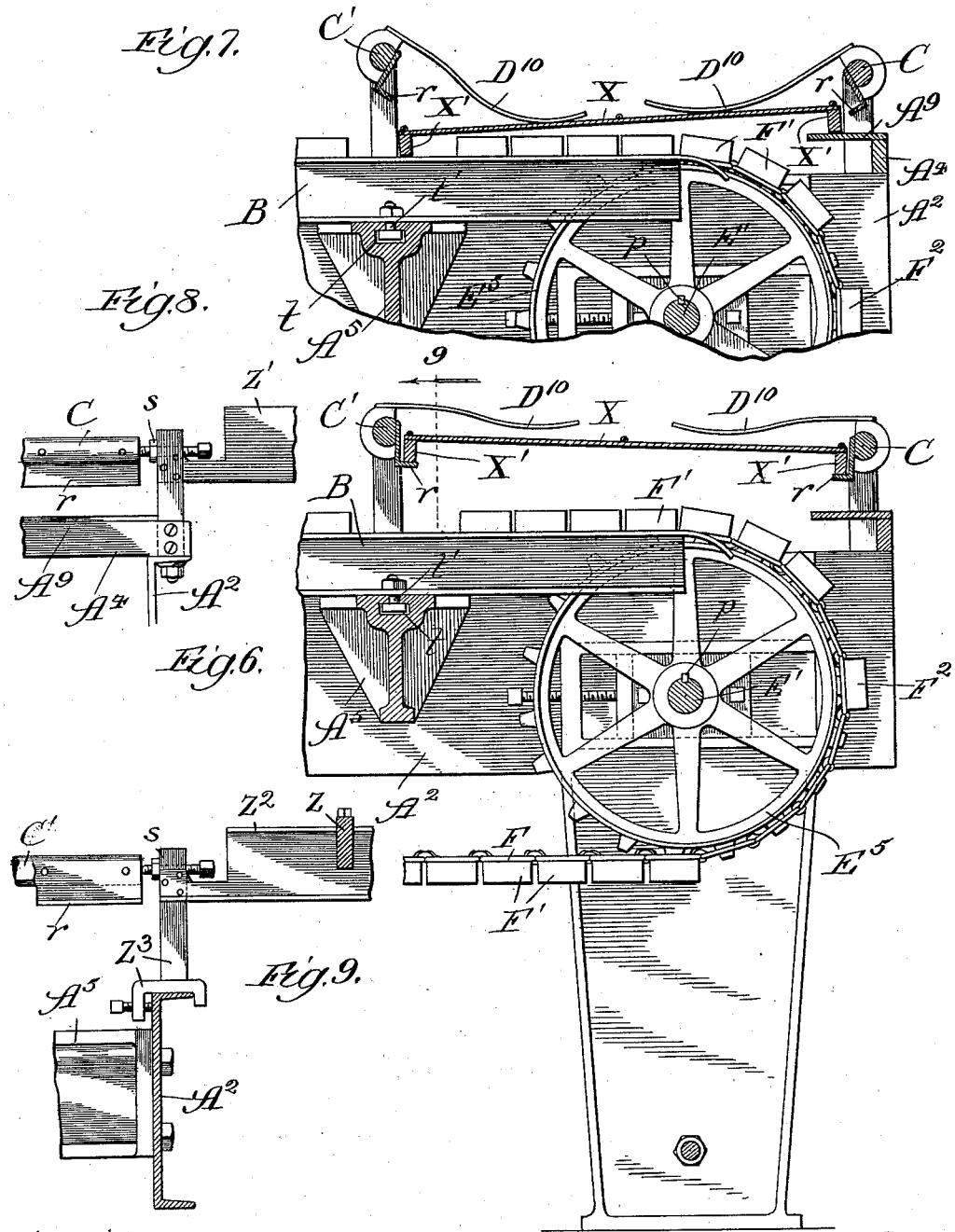
Witnesses:
Inventor:
Frederick P. Rosback,
By Dyrenforth & Dyrenforth,
Attys.

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 7.
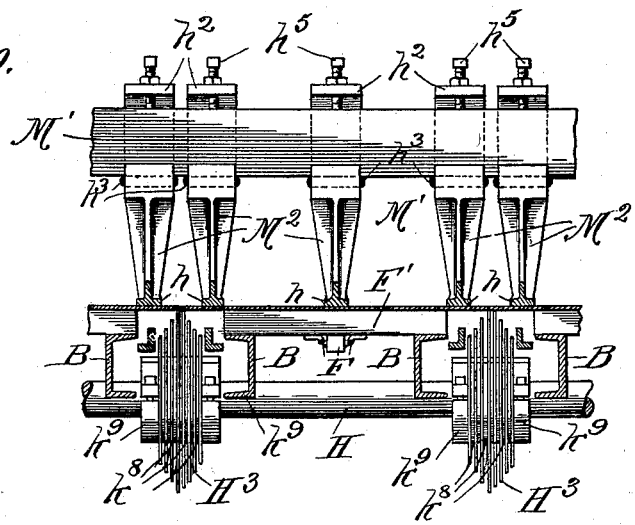
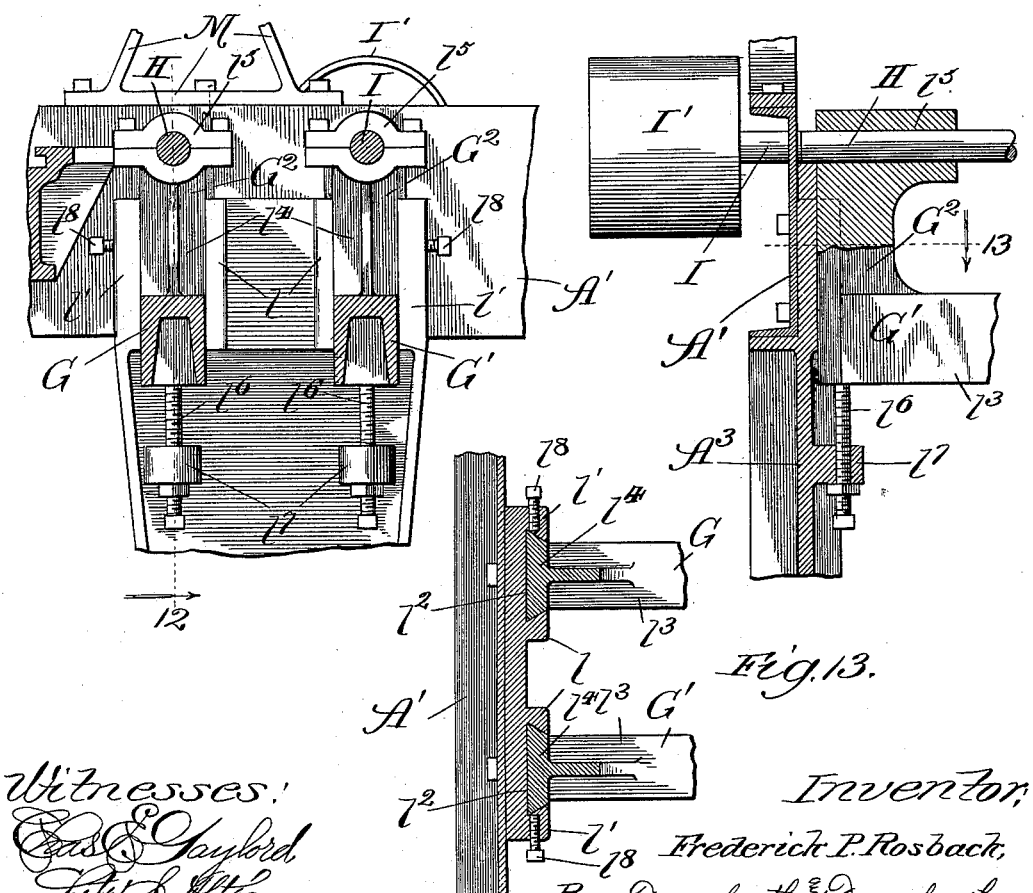
Witnesses:
Chas E Gaylord
Lulu B Alter
Inventor,
Frederick P. Rosback,
By Dyrenforth & Dyrenforth,
Attys.

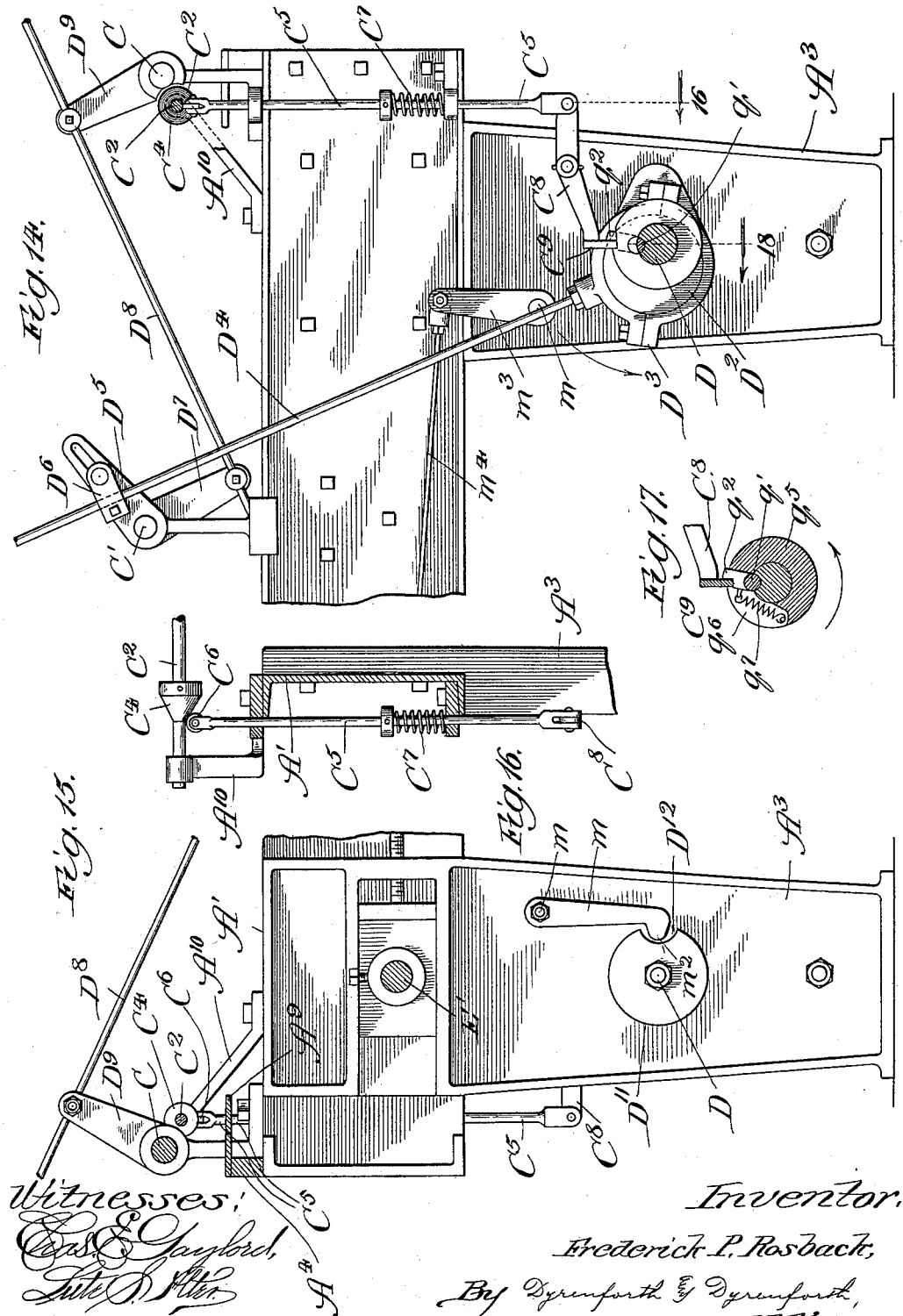

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 9.
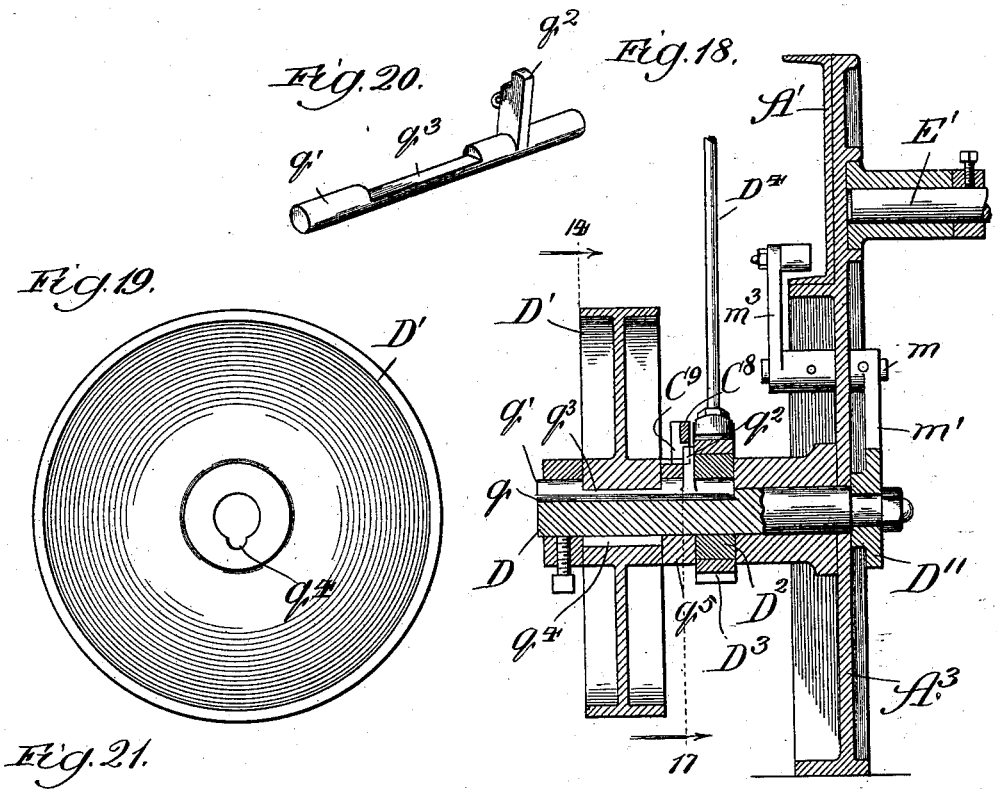
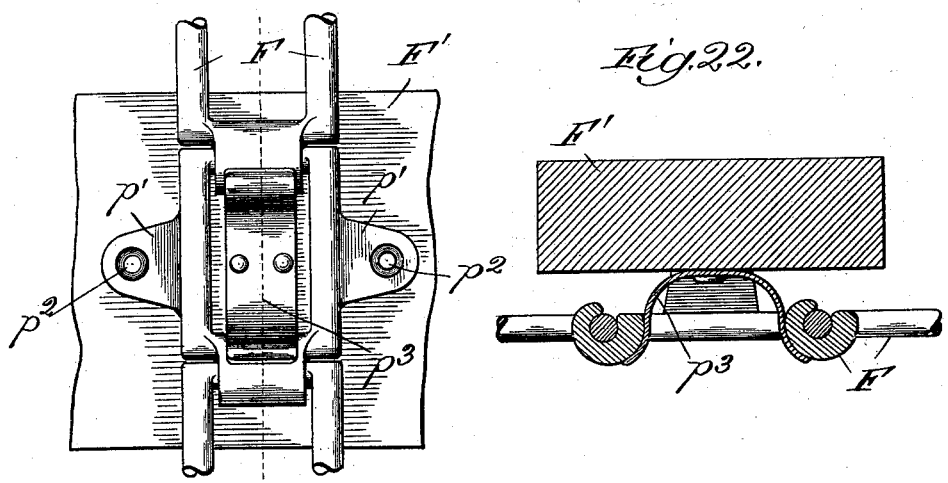
Witnesses:
Chas. E. Gaylord,
Luth S. Peters
Inventor:
Frederick P. Rosback,
By Dyrenforth & Dyrenforth,
Attys.

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 10.
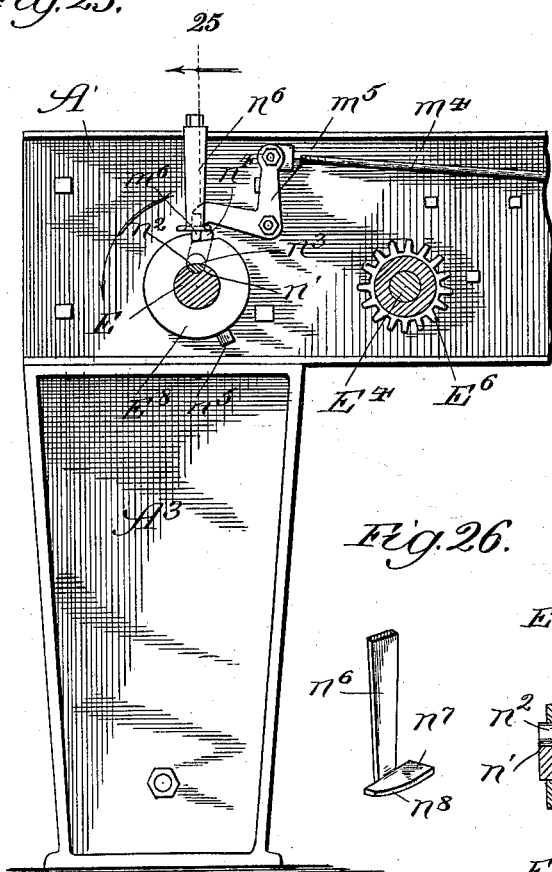
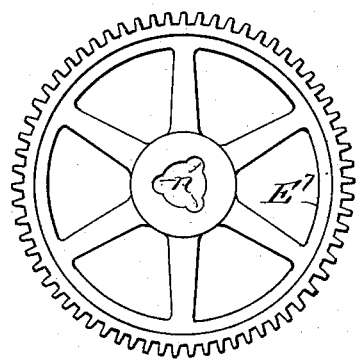
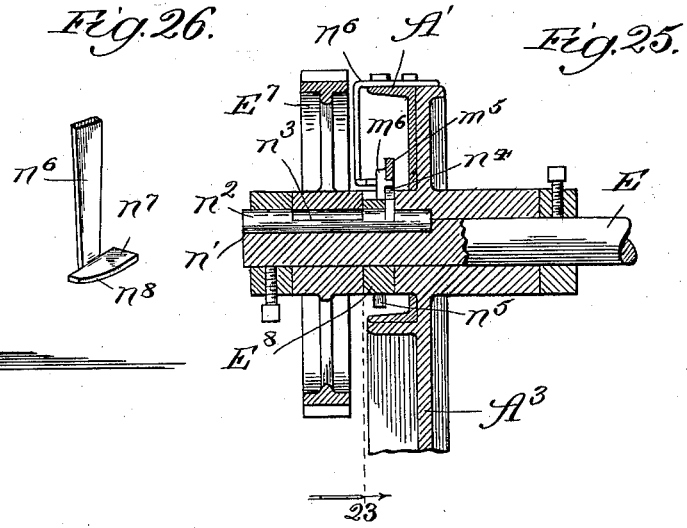
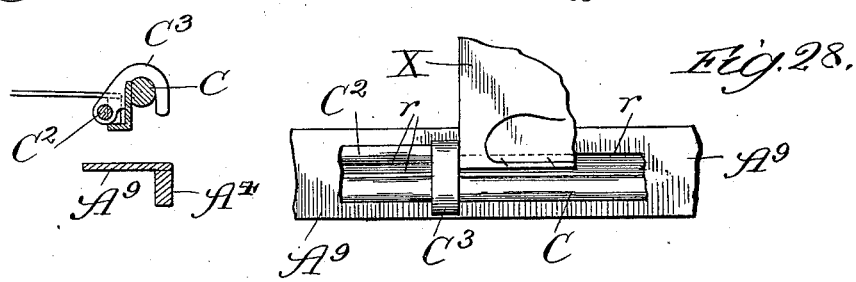
Witnesses.
Inventor.
Frederick P. Rosback,
By Dyrenforth & Dyrenforth,
Att'ys.

No. 609,630. Patented Aug. 23, 1898.
F. P. ROSBACK.
MACHINE FOR STEP MITERING AND PRINTING BOX BLANKS.
(Application filed Dec. 7, 1897.)
(No Model.) 11 Sheets—Sheet 11.
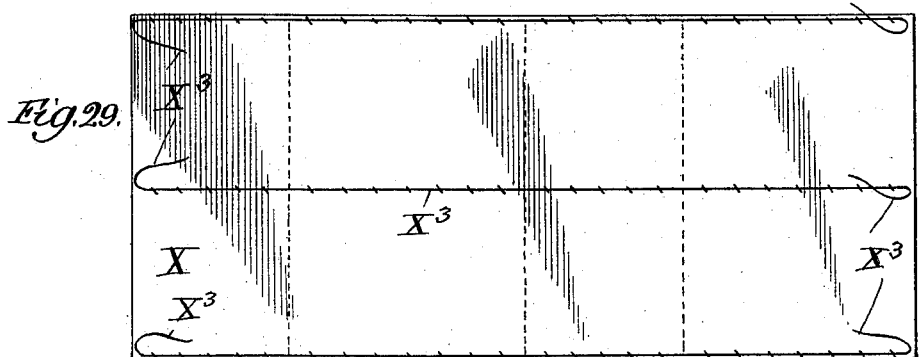
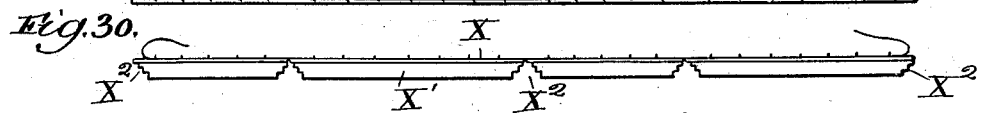
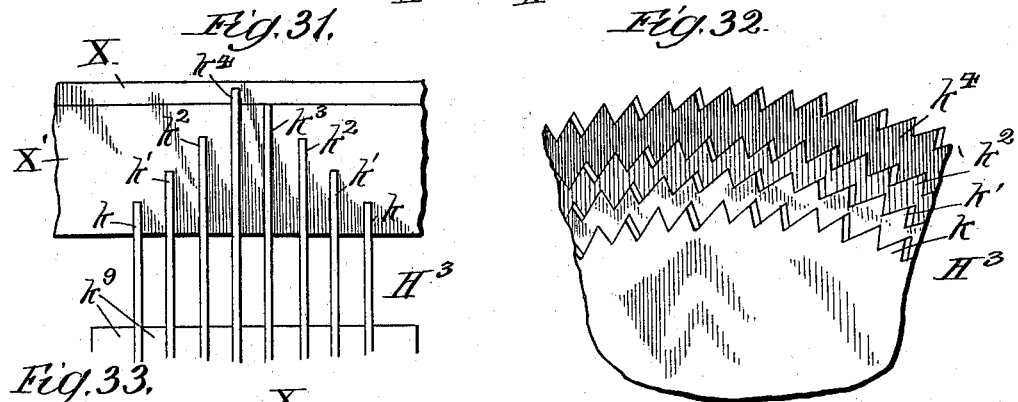
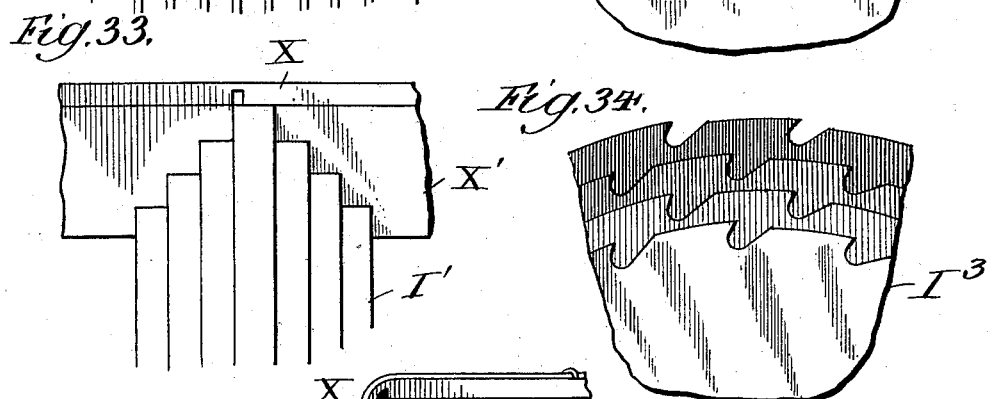
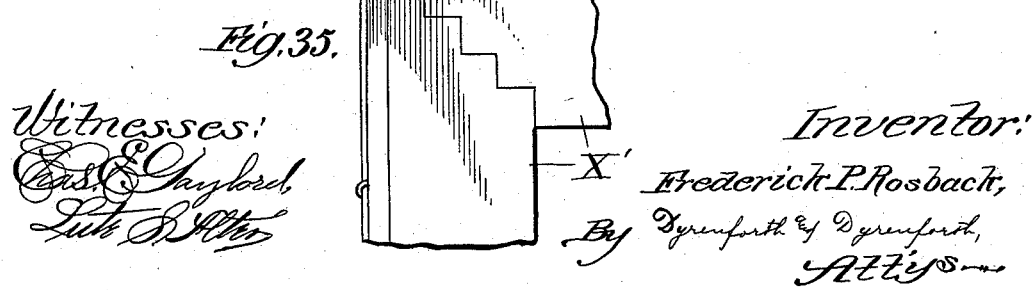
Witnesses: Inventor:
Frederick P. Rosback,
By Dyrenforth & Dyrenforth,
Attys.
THE NORRIS PETERS CO., PHOTO-LITHO., WASHINGTON, D. C.

UNITED STATES PATENT OFFICE.

FREDERICK P. ROSBACK, OF CHICAGO, ILLINOIS, ASSIGNOR TO WILLIAM P. HEALY, OF SAME PLACE.

MACHINE FOR STEP-MITERING AND PRINTING BOX-BLANKS.

SPECIFICATION forming part of Letters Patent No. 609,630, dated August 23, 1898.

Application filed December 7, 1897. Serial No. 661,030. (No model.)

*To all whom it may concern:*

Be it known that I, FREDERICK P. ROSBACK, a citizen of the United States, residing at Chicago, in the county of Cook and State of Illinois, have invented a new and useful Improvement in Machines for Step-Mitering and Printing Box-Blanks, of which the following is a specification.

This invention relates to an improved machine for use more especially in the manufacture of a special box-blank which forms four sides of a wire-bound box or shipping-case. The box-blank when completed and ready to be formed into a box consists of a comparatively thin sheet of wood, wood fiber, or the like, in one length or two or more abutting sections, reinforced on one side with parallel longitudinally-extending cleats and at its opposite side with lengths of wire, the wires, sheet, and cleats being fastened together with staples or the like, driven at intervals to straddle the wires and pass through the sheet into the cleats. A top plan view of the blank is shown in Figure 29 of the drawings.

A machine for making the box-blanks described is shown in application, Serial No. 613,574, filed November 27, 1896. The present machine is intended more especially to coöperate with the machine for making box-blanks referred to, to produce step-mitered cuts in the cleats and in a surface of the sheet, and also trim the blank to the proper length, as illustrated, for example, in Fig. 30 of the accompanying drawings. The machine as I prefer to construct it is also provided with printing mechanism for printing advertisements in one or more colors upon the blanks. To form a box after the blank has passed through the present machine, the blank is bent at the step-mitered cuts to cause the latter to intermesh, as indicated, for example, in Fig. 35 of the present drawings, the blank forming the four sides of the box and ends being inserted and nailed to or resting against the cleats to complete the box. One end section of the blank forms a hinged cover for the box and may be fastened down by twisting together the ends of the reinforcing or strengthening wires, which are caused to extend beyond the ends of the blank for that purpose.

The present invention has nothing to do with the machine for forming the blanks or with inserting the ends and involves only mechanism for making the step-mitered cuts, trimming the blanks to proper length, and printing upon the blank.

It is to be understood that the invention is not limited to the use of printing mechanism.

Figure 2:
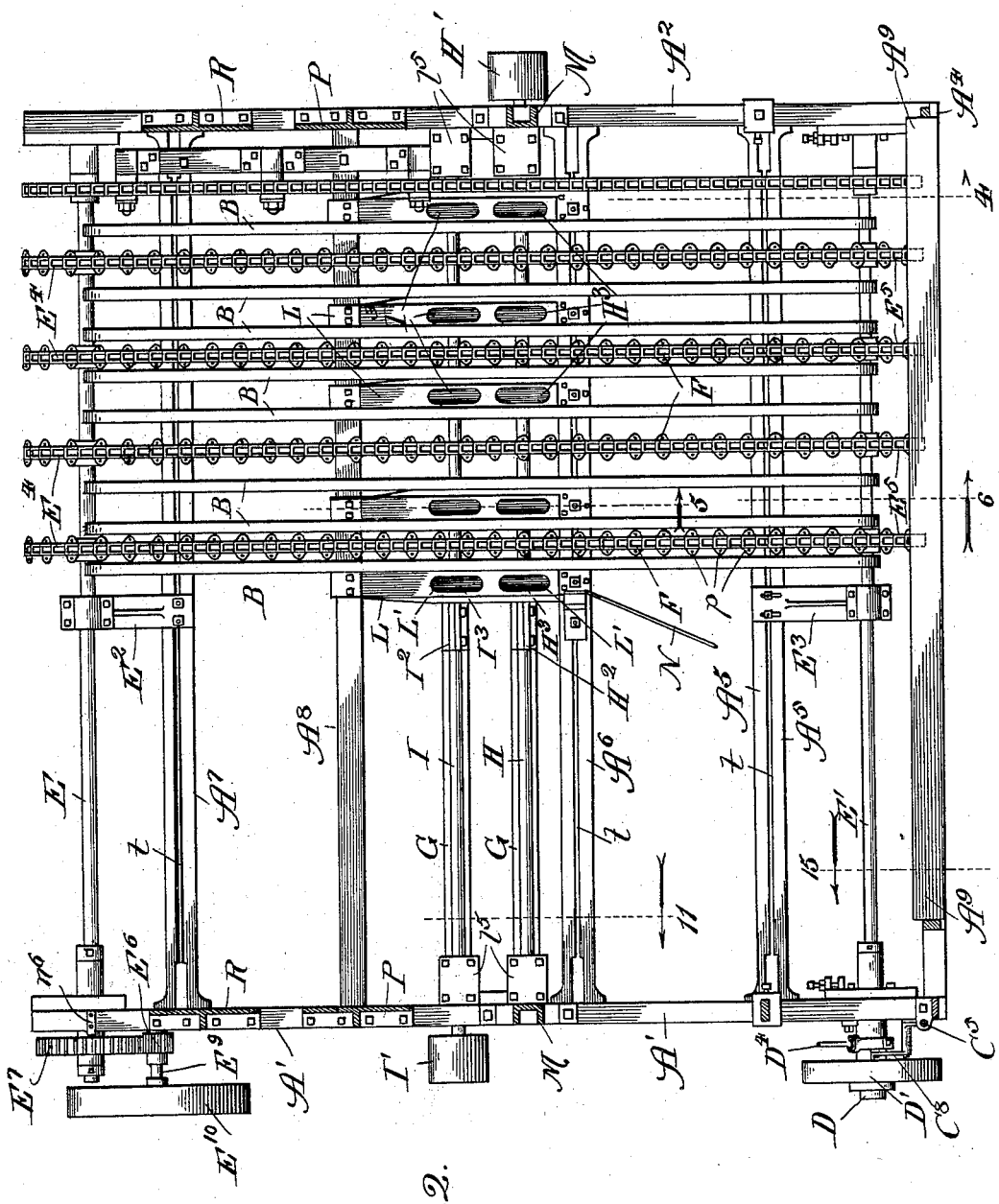

In the drawings, Fig. 1 is a top plan view of the machine; Fig. 2, a plan section thereof taken on line 2 of Fig. 3; Fig. 3, a partly sectional side elevation of the machine; Fig. 4, a longitudinal section taken on line 4 of Fig. 2 and viewed in the direction of the arrow; Figs. 5 and 6, enlarged broken sections taken on lines 5 and 6 of Fig. 2; Fig. 7, a broken view of the mechanism shown in Fig. 6 and illustrating with the latter figure the manner of feeding a blank to the machine; Fig. 8, a broken elevation of a portion of the front of the machine, showing a detail of the construction; Fig. 9, a broken section of a portion of the machine situated just back of the details shown in Fig. 8, the section being taken on line 9 of Fig. 6 and viewed in the direction of the arrow; Fig. 10, a broken section taken on line 10 of Fig. 5 and illustrating clusters of initial cutting-saws; Fig. 11, an enlarged section taken on line 11 of Fig. 2 and showing means for raising and lowering the saw-carrying shafts; Fig. 12, a broken section taken on line 12 of Fig. 11; Fig. 13, a broken section taken on line 13 of Fig. 12; Fig. 14, a broken side elevation of the right-hand or forward end portion of the machine, as illustrated in Fig. 3, with the pulley removed and the pulley-carrying shaft in section, the section being taken on line 14 of Fig. 18; Fig. 15, an enlarged broken section taken on line 15 of Fig. 2; Fig. 16, a section taken on line 16 of Fig. 14 and illustrating details of the construction of starting and stopping mechanism for the machine; Fig. 17, a broken section taken on line 17 of Fig. 18 and illustrating a detail of a clutch; Fig. 18, an enlarged section taken on line 18 of Fig. 14; Fig. 19, a view in side elevation of the pulley shown in Fig. 18; Fig. 20, an enlarged perspective view of one of the details of the clutch mechanism shown in Fig. 18; Fig. 21, a broken plan view of one of the carrier-chains and blocks which feed the blank to the saws and printing mechanism; Fig. 22, a broken section taken on line 22 of Fig. 21; Fig. 23, a broken section taken on line 23 of Fig. 25 and showing certain details of construction at the left-hand end portion of the machine as illustrated in Fig. 3; Fig. 24, a side elevation of a clutch-gear; Fig. 25, an enlarged section taken on line 25 of Fig. 23 and illustrating a drive-shaft and clutch mechanism; Fig. 26, a broken perspective view of one of the details of the construction of the mechanism shown in Figs. 23 and 25; Fig. 27, an enlarged broken section taken on line 27 of Fig. 1; Fig. 28, a broken plan view of the mechanism shown in Fig. 27; Figs. 29 and 30, a plan and a side view, respectively, of the completed box-blank; Fig. 31, an enlarged broken view showing a cluster of initial cutting-saws and the relative position of the blank as it is fed thereto; Fig. 32, a broken side elevation of a cluster of initial cutting-saws; Fig. 33, a broken view showing a cluster of chipping-disks and the relative position of a blank being fed thereto; Fig. 34, a broken side elevation of a cluster of chipping-disks; and Fig. 35, an enlarged broken view of the corner of a completed box, showing how the blank is bent to produce the corner.

The machine is so located with reference to the machine for making the box-blanks above referred to that as the blanks X are discharged from the latter they are pushed one by another into the present machine, being fed, as illustrated in the lower right-hand corner portion of Fig. 1, across the under side of a cross-bar Z, which turns back the forward free ends of the wires, as shown. When a blank arrives in position, it strikes a trip. The two larger pulleys (shown to the left in Fig. 1) are belted to a suitable drive-shaft, whereby they revolve constantly but loosely upon the shafts on which they are mounted. When a blank engages the trip, the latter operates clutch mechanism, which starts feed-chains and causes fingers to press the blank downward onto the feed-chains. The feed-chains move the blank backward across the step-mitering saws and beneath the printing-rollers.

A is the frame of the machine, formed with side bars A' A², mounted upon legs A³, a front bar A⁴, and stationary cross-joists A⁵ A⁶ A⁷ A⁸. The joists A⁵ A⁶ A⁷ are provided in their upper surfaces with longitudinally-extending T slots or recesses $t$, as shown. Resting upon the joists are parallel guide-bars B, extending from near the front nearly to the rear end of the machine. The guide-bars are adjustable toward and away from each other, so that blanks of any size up to the capacity of the machine may be guided, as hereinafter described. The bars B are held in place when adjusted by means of bolts $t'$, (see Figs. 6 and 7,) which pass through flanges on the bars and rest at their heads in the T-slots $t$. To adjust the bars, the nuts upon the bolts are loosened, and they are then slid laterally along the joists and secured again by tightening the nuts.

Extending along the front of the machine on the front bar A⁴ is a stationary shelf A⁹. C and C' are rock-shafts journaled at one end in pin-bearings $s$ on the side bar A², as shown most plainly in Figs. 8 and 9, and journaled at their opposite ends in bearings $s'$ $s'$ on the side bar A'. On the rock-shafts are downward and inward extending guides $r$ $r$, upon which the blank X rests and slides as it is pushed initially into the machine. Journaled in a bearing in the forward left-hand leg A³ is a shaft D, carrying a pulley D', which in practice is belted to a suitable drive-shaft. (Not shown.) In the shaft D (see, for example, Fig. 18) is a groove or recess $q$, and resting in the said recess is a rocking pin $q'$, (see Fig. 20,) having an arm $q^2$ and a cut-away portion $q^3$. The cut-away portion $q^3$ is of a length equal to the width of the pulley D', and in the inner periphery of the hub of the said pulley is a recess $q^4$. When the pin $q'$ is rocked to one position, the pulley turns loosely upon the shaft D in the cut-away portion $q^3$ of the pin. When the pin $q'$ is rocked axially to a position whereby the metal adjacent to the cut-away portion or recess will project into the recess $q^4$, the pulley is locked to the shaft and the shaft will be rotated by the pulley. Thus the pin $q'$ operates as a clutch to produce engagement and disengagement between the pulley and shaft.

Extending parallel with the rock-shaft C is a thrust-rod C², secured at one end to a sliding bearing-hook C³, (see Fig. 27,) which rests upon the shaft C at the point shown in Fig. 1, and passing at its opposite end through an opening in a bearing-bracket A¹⁰ on the side bar A'. In the location shown most plainly in Fig. 1 the thrust-rod carries a cone C⁴. (See Fig. 15.) Extending through bearing-openings in the side bar A' is a vertical rod C⁵, provided at its upper end with an anti-friction-wheel C⁶, which rides on the thrust-rod C² at the cone C⁴. The rod is pressed upward by a confined spring C⁷, as shown in Figs. 14 and 15.

C⁸ is a lever pivoted between its ends against the leg A³ and pivotally connected at its outer end with the lower end of the rod C⁵, as shown in Fig. 14. On the opposite end of the lever C⁸ is a head or lip C⁹.

On the shaft D is a collar $q^5$, provided with a radial recess $q^6$, through which the arm $q^2$ of the pin $q'$ projects. A spring $q^7$ in the recess and connected at one end with the collar and at its opposite end with the arm $q^2$ tends normally to turn the pin $q'$ on its axis to the position wherein it locks the shaft to the pulley. At its outer end the arm $q^2$ projects slightly beyond the circumference of the collar $q^5$ into the path of the lip C⁹, which rides upon the collar. In operation when a blank X slides along the guides $r$ and strikes the stop-piece C³ the latter is moved and moves the thrust-rod C², causing the cone C⁴ to slide upon the antifriction-wheel $C^6$ and move the rod $C^5$ downward against the resistance of the spring $C^7$. This downward movement of the rod $C^5$ turns the lever $C^8$ and raises the lip $C^9$ out of engagement with the arm $q^2$. This release of the arm $q^2$ causes it to be swung by the spring $q^7$ to turn the pin $q'$ axially, whereby it will engage the groove $q^4$ in the pulley and lock the pulley and shaft together. On the shaft D is an eccentric $D^2$, surrounded by an eccentric-ring $D^3$, from which extends a rod $D^4$. On the rock-shaft $C'$ is an arm $D^5$, provided with a longitudinally-extending slot, and adjacent to the said arm is a block $D^6$, having a lateral-extending pin which slides in the slot of the said arm. The block $D^6$ is adjustably secured to the rod $D^4$; also, upon the rock-shaft $C'$ is a downward-extending arm $D^7$, from which extends a rod $D^8$ to an upwardly-extending arm $D^9$, fastened to the rock-shaft C. On the rock-shafts C $C'$, in the positions shown, for example, in Fig. 1, are inwardly-projecting spring-fingers $D^{10}$. Normally the fingers extend in the plane indicated in Fig. 6. When a blank X strikes the stop $C^3$ and causes the shaft D to be clutched by the pulley $D'$, the eccentric $D^2$ is turned to pull down and then raise the rod $D^4$. In the descent of the said rod the shaft $C'$ is rocked to swing its finger $D^{10}$ in the downward direction, and through the connection $D^7$ $D^8$ $D^9$ the shaft C is rocked to swing its finger $D^{10}$ in the downward direction. The fingers $D^{10}$ bear upon the upper surface of the blank X, moving the latter downward from the position shown in Fig. 6 to that shown in Fig. 7. Thus the blank is released from the stop $C^3$, causing the spring $C^7$ to raise the rod $C^5$ to move the rod $C^2$ to its initial position and at the same time swing the lip $C^9$ down against the surface of the collar $q^5$. By this means the lip $C^9$ engages the arm $q^2$ as the shaft is about to complete one revolution and draws it to the position shown in Fig. 17, whereby the pin $q'$ is rocked out of engagement with the pulley and the shaft stops at the end of one revolution.

E is a shaft at the rear end of the machine, journaled at opposite ends in bearings in the side bars $A'$ $A^2$, and $E'$ is a companion shaft toward the front of the machine, also journaled at opposite ends in the said side bars.

$E^2$ is a stay removably fastened to the joist $A^7$ and at its free end forming a bearing for the shaft E between the ends of the latter. $E^3$ is a similar stay fastened to the joist $A^5$ and forming a bearing through which the shaft $E'$ passes. The stays $E^2 E^3$ are provided to steady the shafts and are required on account of the length of the latter. The said shafts are provided with keyways, as shown, for example, in Figs. 4, 6, and 7. On the shaft E are sprocket-wheels $E^4$, fastened with removable keys $p$ to revolve therewith. On the shaft $E'$ are sprocket-wheels $E^5$, coinciding in position with the sprockets $E^4$ and fastened in the same way. Extending over companion sprocket-wheels $E^4$ $E^5$ are feed-chains F, formed as shown most plainly in Figs. 21 and 22. Every second link of each feed-chain is formed with laterally-extending ears $p'$, having screw-holes $p^2$. At their upper sides the feed-chains run between guide-bars B, the tops of the chains being in the planes of the upper surfaces of said bars.

$F'$ $F'$ are series of feed-blocks, which may be of wood, the first and last block of each series being fastened to the upper side of a link of a chain F with screws passing through the screw-opening $p^2$ into the blocks. The intermediate blocks $F'$ are provided on their under surfaces, as shown in Fig. 22, with bowed spring-catches $p^3$, which when sprung into the links hold the blocks to the chain. The blocks are of a length which cause them to ride or slide upon the guide-bars B and are of a thickness approximating the thickness of the cleats $X'$ (see Fig. 30) of the blank X. A series of blocks consists of a sufficient number to form a length nearly, but not quite, equal to the distance between the cleats $X'$ of a blank, as indicated most clearly in Figs. 6 and 7. Journaled in the side bar $A'$ near the shaft E is a short shaft $E^9$, carrying a pulley $E^{10}$ and a pinion $E^6$. The pulley $E^{10}$ is belted to a suitable driving power, whereby it, the shaft $E^9$, and pinion $E^6$ revolve constantly. On the shaft E beyond the side bar $A'$ is a gear-wheel $E^7$. (See Figs. 1, 2, 3, 24, and 25.) In the bearing-opening of the gear-wheel $E^7$ are three recesses $n$. (Shown in Fig. 24.) In the end of the shaft E (see Figs. 23 and 25) is a recess $n'$, in which is located a rocking pin $n^2$, having a recess $n^3$ in one side of a length equal to the width of the hub of the wheel $E^7$. The pin $n'$ is of the same form and performs the same function as the rocking-pin $q'$. (Shown in Fig. 20 and before described.) On the pin is an arm $n^4$ substantially like the arm $q^2$ on the pin $q'$. On the shaft E and revolving therewith is a collar $E^8$, having a radial recess through which the arm $n^4$ projects. The collar $E^8$ is substantially like the collar $q^5$, before described, and the arm $n^4$ is connected with the collar by a spring, the construction being the same as that shown in Fig. 17 and before described, whereby the spring tends normally to rock the pin $n^2$, so that it will lock the shaft to the constantly-rotating gear-wheel $E^7$. The collar $E^8$ differs from the collar $q^5$ in that it carries a projecting cam $n^5$. Fastened against the side bar $A'$ and extending downward close to the collar $E^8$ is a spring-finger $n^6$, carrying an offset or shelf $n^7$, provided with a cam edge $n^8$. (See Fig. 26.)

On the inner side of the leg $A^3$ at the front of the machine and mounted upon the shaft D is a disk $D^{11}$, having a notch $D^{12}$ in its periphery. Journaled in the leg and passing through the latter is a short rock-shaft $m$, (see Figs. 15 and 18,) having on the inner side of the leg a downward-extending arm $m'$, provided with a toe $m^2$, which rides upon the circumference of the disk $D^{11}$ and enters the notch $D^{12}$. On the opposite side of the said leg $A^3$ and fixed upon the shaft $m$ is an arm or lever $m^3$, from the free end of which extends a rod $m^4$ to a bell-crank lever $m^5$, (see Fig. 23,) fulcrumed toward the rear end of the bar $A'$. The lever $m^5$ carries a laterally-extending lip $m^6$, which rides upon the circumference of the collar $E^8$ and engages the projecting end of the arm $n^4$.

In the rotation of the shaft D, as before described, the disk $D^{11}$ is turned and swings the arm $m'$ by forcing the toe $m^2$ out of the recess $D^{12}$, whereby the toe rides upon the circumference of the disk $D^{11}$. The swinging of the arm $m'$ rocks the shaft $m$ and turns the arm $m^3$ in the direction of drawing upon the rod $m^4$, whereby it swings the bell-crank lever $m^5$ to disengage the arm $n^4$ of the rocking pin $n^2$. The spring corresponding with spring $q^7$, as before mentioned, draws the arm $n^4$ over to rock the pin $n^2$ on its axis and locks the shaft E to the gear-wheel $E^7$ by engaging one of the recesses $n$ in the latter. Thus the shaft E will rotate with the gear-wheel $E^7$. The cam-offset $n^7$ at the lower end of the spring-finger $n^6$ presses against the laterally-extending lip $m^6$ on the lever $m^5$, so that when the said lip is raised the part $n^7$ of the spring-finger springs beneath it and holds it in a raised position. In the rotation of the shaft E and collar $E^8$ the cam $n^5$ engages the cam-surface $n^8$ of the spring-finger. On the rod $m^4$ and confined between a collar $m^7$ thereon (see Fig. 3) and a stop $m^8$ on the side bar $A'$ is a spring $m^9$, which tends to thrust the rod $m^4$ in the direction from right to left in Fig. 3. When the cam $n^5$ engages the cam edge $n^8$ on the spring-finger $n^6$, it moves the offset $n^7$ out of engagement with the bell-crank lever, whereby the lip $m^6$ on the latter is pressed down upon the circumferential face of the collar $E^8$. Thus when the shaft E and attendant parts have nearly completed one revolution the arm $n^4$ of the rocking pin is engaged by the lip $m^6$ and the shaft E unlocked from the gear-wheel $E^7$ just as one revolution is completed. The turning of the shaft E one revolution, as described, causes the sprocket-wheels $E^4$, feed-chains F, blocks $F'$, and sprocket-wheels $E^5$ to be moved. Just before starting one series of feed-blocks $F'$ are in the position indicated in Fig. 7, so that when a blank X is pressed down, as before described, to the position there shown the forward block of the series engages the cleat $X'$ and the blank is moved laterally into the machine. Following each series of blocks $F'$ is a single block $F^2$, also secured to the feed-chain, which engages the other cleat $X'$. It will be understood that the blocks are so positioned upon the feed-chains that they will engage the cleats of a blank of the size being manufactured. Thus while the first and last blocks engage the cleats the sheet or web of the blank rests firmly at its under surface upon the surfaces of the intervening blocks, which form a solid bed therefor.

On the inner sides of the intermediate legs $A^3$ and side bars $A'$ $A^2$ are vertical guides $l\,l'$, forming at the said side bars coincident pairs of vertical dovetailed guide-sockets $l^2$, as shown most plainly in Fig. 13. G $G'$ are frames each consisting of a cross-bar $l^3$ with a vertical journal-box $G^2$ at each end. Each journal-box comprises a vertical plate $l^4$, which slides in a vertical guide $l^2$, and a removable and replaceable bearing-cap $l^5$. The frames G $G'$ are thus mounted at opposite ends in the vertical dovetailed guide-recesses $l^2$ and rest at opposite ends on adjusting-screws $l^6$, which pass through lugs $l^7\,l^7$ on the inner faces of the intermediate legs $A^3$. The frames may be raised and lowered by turning the screws $l^6$, and when adjusted as to height they are secured in place by means of set-screws $l^8$, which pass through the guides $l'$ and are tightened against the vertical plate portions $l^4$ of the frames.

Journaled in the journal-boxes $G^2$ of the frames, respectively, are shafts H I. The shaft H, beyond the side bar $A^2$, carries a belt-pulley $H'$, and the shaft I, beyond the side bar $A'$, carries a belt-pulley $I'$. The pulleys $H'\,I'$ are belted to a suitable drive-shaft to rotate constantly. Between the ends of the shafts I H are stays $I^2\,H^2$, adjustably fastened to the bars $l^3$ and loosely embracing the shafts to steady them. On the shaft H are clusters $H^3$ of saws of the form shown in Figs. 31 and 32. Each cluster $H^3$ consists of eight saw-disks, the two outer ones $k$ being of the same diameter, the two next inner ones $k'$ being of slightly-greater diameter, the two next ones $k^2$ being of still greater diameter, and the two central ones $k^3\,k^4$ being one of slightly-larger diameter than the other and both of larger diameter than the saws $k^2$. The saw clusters $H^3$ are intended to produce the initial saw-cuts for step-mitering the blanks and engage the blank, as indicated most plainly in Fig. 31. The saw-disks are separated from each other by means of spacing-collars $k^8$, as shown in Fig. 10, and are clamped between collars $k^9$ on the shaft H. The collars $k^9$ are split and held together with bolts, whereby they may be readily removed from the shaft H and permit adjustment of the clusters along the shaft for the purpose of positioning them. On the shaft I, coincident with the clusters $H^3$, are clusters $I^3$ of chipping-disks, consisting of seven toothed disks which attack the blank, as shown in Fig. 33, to chip out the wood between the cuts produced by the clusters $H^3$ and produce step-miters $X^2$, as shown in Fig. 30.

Fastened upon the cross-joists $A^6\,A^8$, at each pair of saw clusters $H^3\,I^3$, is a bed-plate L, each having a pair of elongated openings L' L', through which the saw clusters project, as shown most plainly in Fig. 5. The bed-plates L are shaped longitudinally, as shown in Fig. 5, to extend at one end flatwise over the joist $A^6$ and at its opposite end to extend over and under the flange of the cross-joist $A^8$. At the joist $A^6$ the bed-plates are fastened down by means of bolts $t'$, being positioned as to height by means of set-screws $i$. The bed-plates are secured to the joists $A^8$ by means of set-screws $i'$, one of which bears against the upper side of the flange of the joist and the other against the under side.

On the side bars $A'$ $A^2$ in the positions shown are coincident upward-extending brackets M.

M' is a bar fastened at opposite ends in the brackets M.

$M^2$ $M^2$ are presser-feet, of which twelve are employed in the present machine, as shown in Fig. 1. They are all constructed alike and as shown most plainly in Figs. 5 and 10. Each has a long and narrow forward and backward extending foot portion, presenting a smooth under surface $h$, with an upwardly-curved forward end $h'$. The upper portion of each presser-foot is provided with a flange $h^2$ to extend over the bar M' and a socket $h^3$ to receive the lower edge of said bar. In the socket $h^3$ of each foot is a cushioning-block $h^4$, of rubber or the like, and the feet are fastened to the bar M' by means of set-screws $h^5$.

In operation when the blank X is deposited upon the carriers F', as shown in Fig. 7, it is moved laterally in the backward direction a distance equal to the circumference of the sprocket-wheels $E^4$ $E^5$, which carries it to the position shown in Fig. 5. In the next following revolution of the sprocket-wheels, brought about as before stated, the blank is carried backward to the rear end of the machine. In the backward movement of the blank from the position shown in Fig. 7 it passes beneath the presser-feet $M^2$ and is operated upon first by the saw clusters $H^3$ and then by the saw clusters $I^3$, whereby the step-miter cuts are formed in the cleats, and cuts are produced by the central saws $k^4$ in the under side of the sheet. The presser-feet operate to hold the blank firmly down upon the feed-blocks F' and in sliding contact with the bed-plates L. In the position shown in Figs. 1 and 2 is a slanting guide N. When the blank is first deposited upon the feed-blocks F', it is at a point slightly beyond the position it should occupy in moving across the saws. As it is moved in the backward position from the position shown in Fig. 1 the end of the blank strikes the guide N and is positioned thereby to cause the cuts to be formed at the proper points in its movement across the saws.

As before stated, it is desirable to print advertisements upon the blanks to appear on the outer surfaces of the boxes when they are formed. In order that the printing may be performed in one or two colors, the two printing mechanisms to be next described are provided.

Mounted upon the side bars $A'$ $A^2$ are forward cheeks or standards P and rear cheeks or standards R. Journaled in the standards P is a shaft P', carrying a cylinder $P^2$, forming a printing cylinder or bed, upon which a printing-form may be secured in any desirable way. On the shaft P', adjacent to the side bar $A^2$, is a sprocket-wheel $P^3$. Above the cylinder $P^2$ is an ink-trough $P^4$ and ink-rollers $P^5$, which transfer ink from the trough to the form on the cylinder. The cylinder-shaft carries a gear $P^6$, and the rollers have pinions $P^7$, (see Fig. 3,) whereby the rollers are rotated from the cylinder-shaft. Journaled in the standards R is a shaft R', carrying a printing-cylinder $R^2$ and sprocket-wheel $R^3$. Above the cylinder $R^2$ is an ink-trough $R^4$ and ink-rollers $R^5$, geared like the rollers $P^5$ to the cylinder-shaft, which transfer ink from the trough to the form on the cylinder $R^2$. Mounted in standards on the side bar $A^2$ are idle sprocket-pinions S, as shown in Fig. 4. On the shaft E is a sprocket-wheel S' in line with the sprocket-wheels $R^3$ $P^3$ and sprocket-pinions S, and on the shaft E' is a sprocket-wheel $S^2$ in line with the other sprocket-wheels mentioned. A drive-chain $S^3$ extends around the sprocket-wheels S' $S^2$, over the idlers S, and under the sprocket-wheels $R^3$ $P^3$. Each time the shaft E is rotated as before described the printing-cylinders are given one complete revolution, whereby a blank as it is fed beneath them after passing the saws is printed by the forms on the cylinders.

It will be understood from the above description that in two intermittent revolutions of the shaft E, brought about as before stated, a box-blank is step-mitered and printed ready to be folded at the step-miter cuts, as indicated in Fig. 35, to form the four sides of a box.

When the blanks are initially pushed into the machine, they move between lateral guides Z' $Z^2$, which lead to the upsetting-guides $r$. The shaft C' and attendant parts and the guide $Z^2$ are supported in shifting brackets $Z^3$, (see Fig. 9,) which may be moved along the side bars and adjusted to accommodate blanks of any width within the capacity of the machine. As a blank is moved in the guides Z' $Z^2$, with the wires $X^3$ extending as shown in Fig. 29, the forward ends of the wires are engaged by the bar Z and turned back, as shown in Fig 1. Then when the blank is lowered onto the feed-chains F the next blank while passing over its end engages and turns back the wires at the opposite ends. This is important because it bends the wires at the ends out of the way of the end saw clusters.

While it is preferred to construct the machine throughout as shown and described, it may of course be modified in the matter of details of construction without departing from the spirit of the invention as defined by the claims.

What is claimed as new, and desired to be secured by Letters Patent, is—

1. In a step-mitering machine, the combination with the feeding mechanism for the material to be step-mitered operating to advance the material sidewise as regards its grain, of rotating initial cutting-saws, in the path of the material as it is fed, operating to produce the side cuts of the steps across the grain of the material, and rotating chipping-disks in the path of the material beyond said saws operating to chip out the material between the side cuts to produce the steps, substantially as described.

2. In a step-mitering machine, the combination with the feeding mechanism for the material to be step-mitered operating to advance the material sidewise as regards its grain, of a rotating saw cluster $H^3$, in the path of the material as it is fed, operating to produce the side cuts of the steps across the grain of the material, and a rotating cluster $I^3$ of chipping-disks in the path of the material beyond said saw cluster operating to chip out the material between the side cuts to produce the steps, substantially as described.

3. In a step-mitering machine, the combination with the feeding mechanism for the material to be step-mitered operating to advance the material sidewise as regards its grain, of a rotating shaft carrying a series of initial-cutting-saw clusters in the path of the material as it is fed to produce the side cuts of the steps across the grain of the material, and a rotating shaft carrying a series of chipping-disk clusters in the path of the material beyond said saw clusters operating to chip out the material between the side cuts to produce the steps, substantially as described.

4. In a step-mitering machine, the combination with the feeding mechanism for the material to be step-mitered operating to advance the material sidewise as regards its grain, of a rotating shaft carrying initial-cutting-saw clusters adjustable toward and away from each other and in the path of the material as it is fed to produce the side cuts of the steps across the grain of the material, and a shaft carrying clusters of chipping-disks adjustable toward and away from each other and in the path of the material beyond said saw clusters operating to chip out the material between the side cuts to produce the steps, substantially as described.

5. In a step-mitering and printing machine, the combination with the feeding mechanism for the material to be step-mitered and printed operating to advance the material sidewise as regards its grain, of step-mitering mechanism in the path of the material as it is fed comprising rotating initial cutting-saws and rotating chipping-disks beyond said saws, and a printing-cylinder in position to print upon the material as it passes through the machine, substantially as described.

6. In a step-mitering and printing machine, the combination with the feeding mechanism for the material to be step-mitered operating to advance the material sidewise as regards its grain, of rotating initial cutting-saws in the path of the material as it is fed, operating to produce the side cuts of the steps across the grain of the material, rotating chipping-disks in the path of the material beyond said saws operating to chip out the material between the side cuts to produce the steps, and a printing-cylinder beyond the said chipping-disks and operating to print upon the material as it passes to the end of the machine, substantially as described.

7. In a step-mitering machine, the combination of intermittent feed mechanism for the material to be step-mitered, a guide for the material, extending crosswise of and over the initial end portion of said feed mechanism, through which the material is advanced laterally into the machine, trip mechanism at said guide in the path of said material, means for depressing said material and transferring it from said guide to the feed mechanism, means for starting the feed mechanism and transferring mechanism actuated by the trip mechanism through contact with the latter of the said material, and rotating step-mitering disks in the path of the material as it is fed by said feed mechanism, substantially as described.

8. In a machine for step-mitering a box-blank, which consists of a sheet reinforced on one side with cleats, means for advancing the blanks through the machine comprising movable endless chains and feed-blocks on the chains adapted to engage the cleats and form a bed with which the sheet rests in contact, and rotating step-mitering disks in the path of the material, substantially as described.

9. In a machine for step-mitering box-blanks, the combination with the rotating shafts carrying the step-mitering disks, of shafts E E' normally stationary, sprocket-wheels on said shafts, feed-chains on said sprocket-wheels, provided with means for engaging and moving the blanks across the step-mitering disks, rotating means for the shafts E E', normally out of engagement therewith, a guide, through which the blanks are advanced into the machine from one side thereof, extending crosswise of and over one end of said feed-chains, means for depressing and transferring the blanks from the guide to the feed-chains, clutch mechanism operating to produce engagement between said shafts and their rotating means, and trip mechanism at said guide in the path of the blanks operatively connected with said transferring and clutch mechanisms, substantially as and for the purpose set forth.

10. The combination of the upsetting-guides $r$, traveling feed F, blank engaging and depressing fingers $D^{10}$ and trip mechanism in the path of the blanks as they are advanced into the machine operatively connected with said guides and fingers, substantially as and for the purpose set forth.

11. In a machine for step-mitering box-blanks provided with cleats on one side and reinforcing-wires on the opposite side having projecting ends, the combination with the guide through which the blanks are advanced into the machine, of a wire-end engager on the guide operating to engage and turn back the projecting ends of the wires, substantially as and for the purpose set forth.

FREDERICK P. ROSBACK.

In presence of—
R. T. SPENCER,
J. H. LEE.